July 3, 1951 — E. C. KASTNER — 2,558,903

SERVICING MACHINE FOR BUILDING TIRES

Filed April 12, 1949 — 4 Sheets-Sheet 1

INVENTOR.
EDWARD C. KASTNER
BY
Bates, Teare, & M<sup>c</sup>Bean
Attorneys

July 3, 1951 E. C. KASTNER 2,558,903
SERVICING MACHINE FOR BUILDING TIRES
Filed April 12, 1949 4 Sheets-Sheet 2
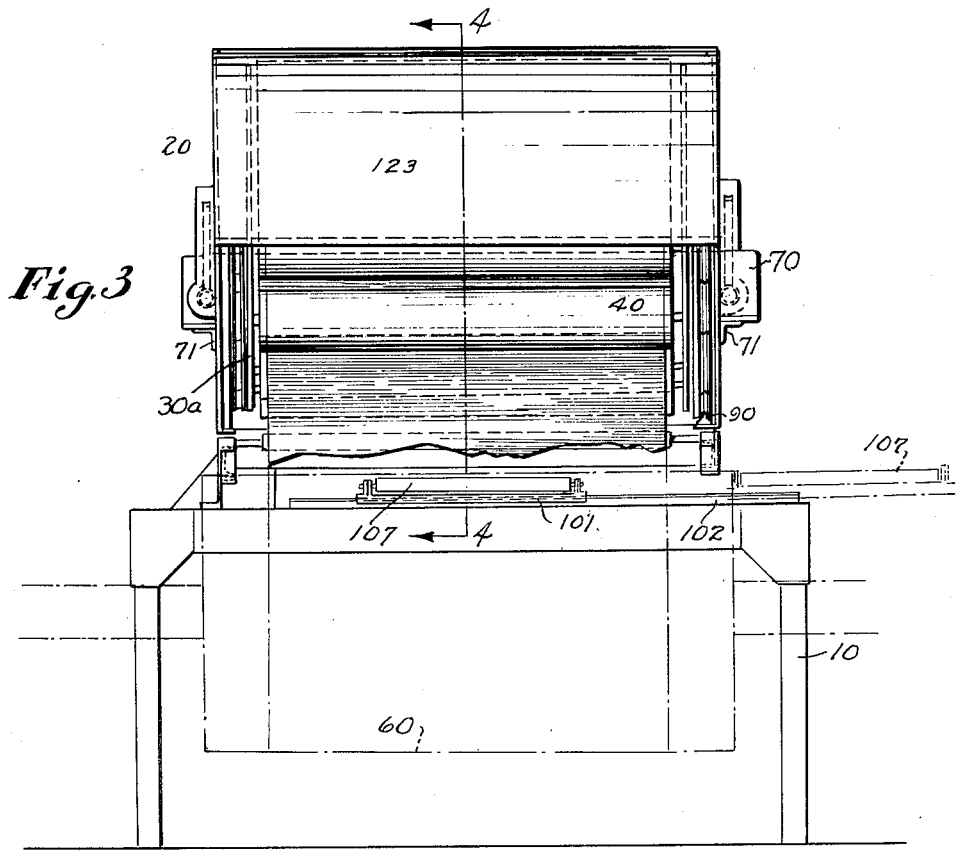
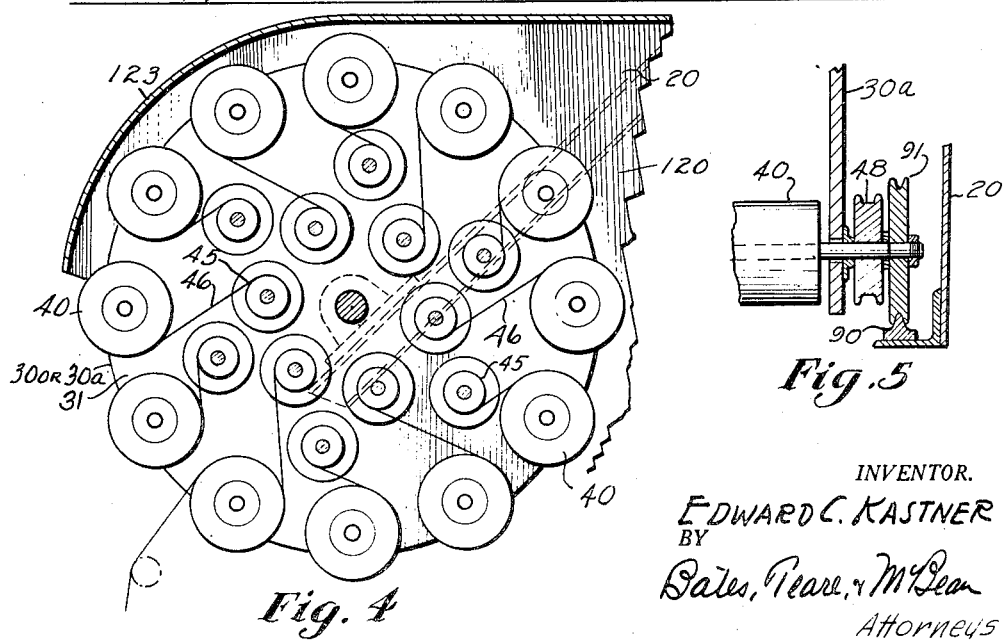
INVENTOR.
EDWARD C. KASTNER
BY
Bates, Teare, & McBean
Attorneys July 3, 1951　　　　　　　　E. C. KASTNER　　　　　　　　2,558,903
SERVICING MACHINE FOR BUILDING TIRES
Filed April 12, 1949　　　　　　　　　　　　　　　4 Sheets-Sheet 3
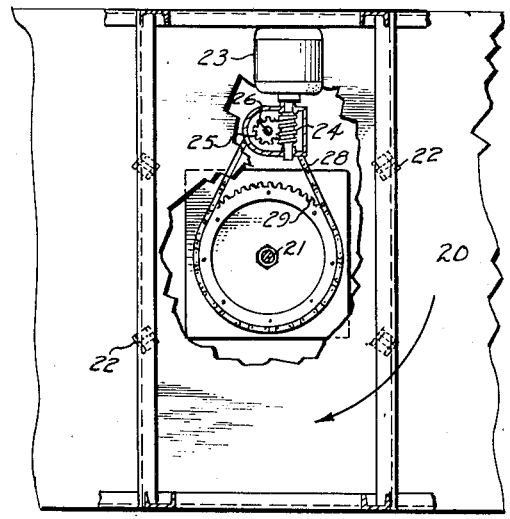
Fig. 6
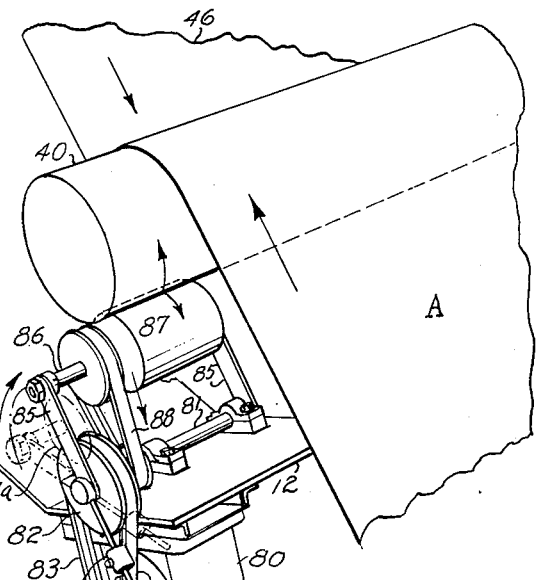
Fig. 7
Fig. 8
INVENTOR.
EDWARD C. KASTNER
BY
Bates, Teare, y McBean
Attorneys July 3, 1951 — E. C. KASTNER — 2,558,903
SERVICING MACHINE FOR BUILDING TIRES
Filed April 12, 1949 — 4 Sheets-Sheet 4

INVENTOR.
EDWARD C. KASTNER
BY
Bates, Teare, & McKean
Attorneys

Patented July 3, 1951

2,558,903

UNITED STATES PATENT OFFICE 2,558,903

SERVICING MACHINE FOR BUILDING TIRES

Edward C. Kastner, Akron, Ohio, assignor to Akron Standard Mold Company, Akron, Ohio, a corporation of Ohio Application April 12, 1949, Serial No. 87,011

11 Claims. (Cl. 154—10)

This invention relates to apparatus for the storage of wound-up strip material adapted to be withdrawn for use in a tire building machine of the drum type. It is an object of the invention to provide for a maximum quantity of stored material in a minimum space. It is also an object to provide for the ready loading of the material into the storage mechanism. Another feature of the invention comprises a conveyor associated with the storage mechanism adapted to convey a tread strip to the tire building drum to be wrapped around the same in association with material readily drawn from the storage mechanism.

Briefly, a preferred machine made in accordance with my invention provides a turret mounted on a vertical axis and carrying two storage members each mounted on a horizontal axis. Each storage member carries a set of strip-storage rolls and a set of cooperating liner-carrying rolls. The machine provides means for feeding strips from a suitable supply to the storage rolls, with liners interleaved between successive turns, in one of the storage members while the other storage member is in position to allow a strip to be drawn off from one of its rolls to an adjacent tire building drum. When the latter storage member has thus become empty a half rotation of the turret interchanges the position of the two storage members. The machine also has a conveyor on which a heavy tread strip may be mounted and which may be positioned beneath the turret to feed the tread strip to the tire building drum.

The drawings illustrate a preferred form of my invention embodying the above-outlined features and others as hereinafter fully explained.

Figure 1:
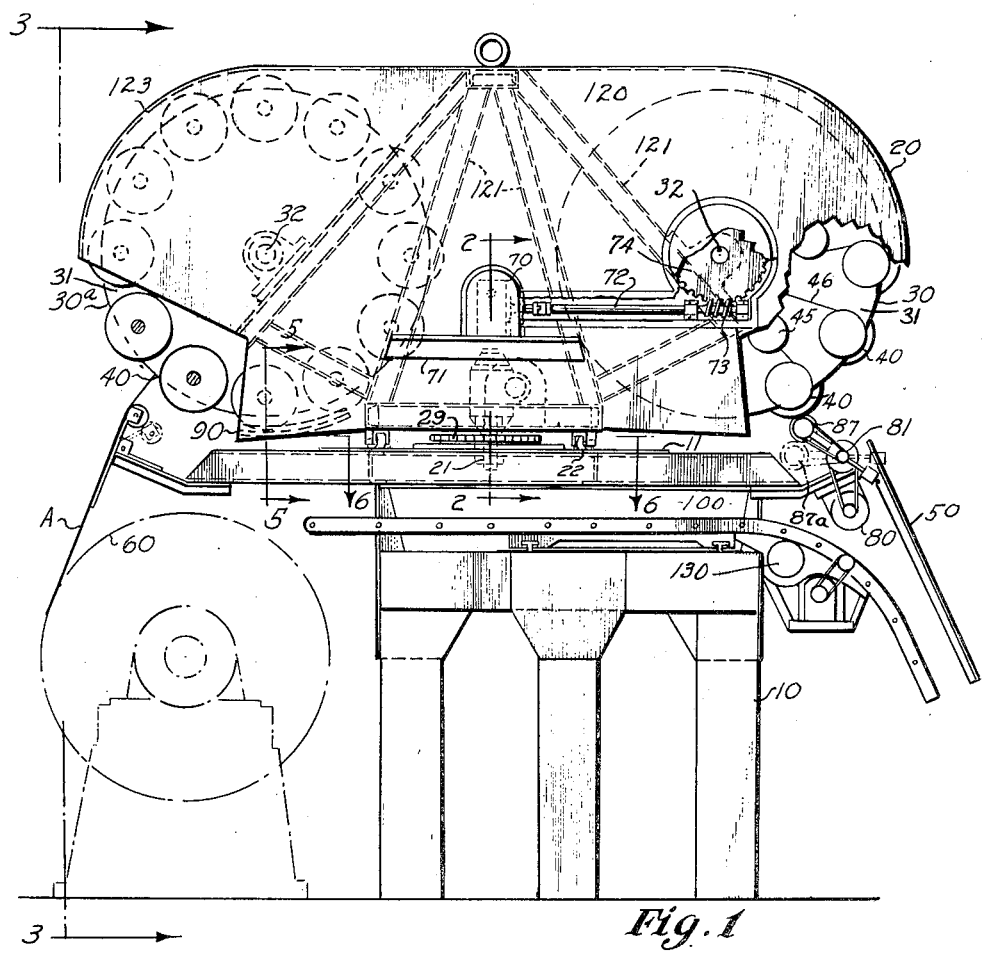
Figure 2:
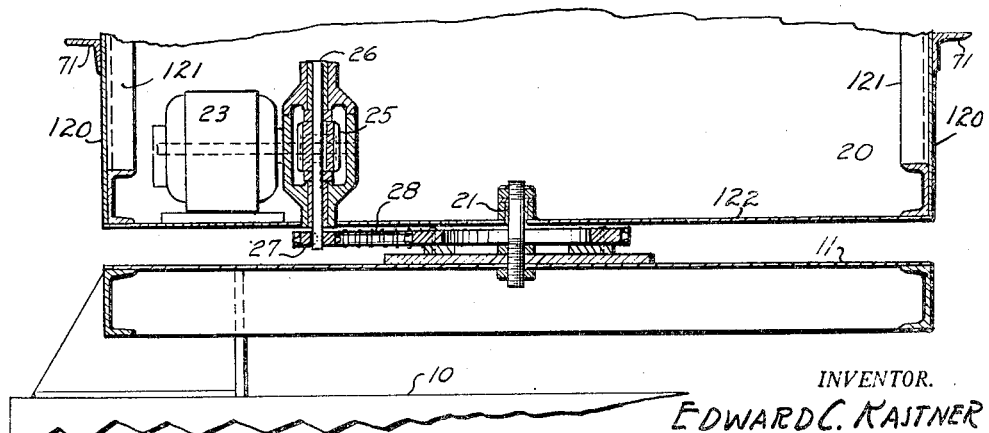
Figure 9:
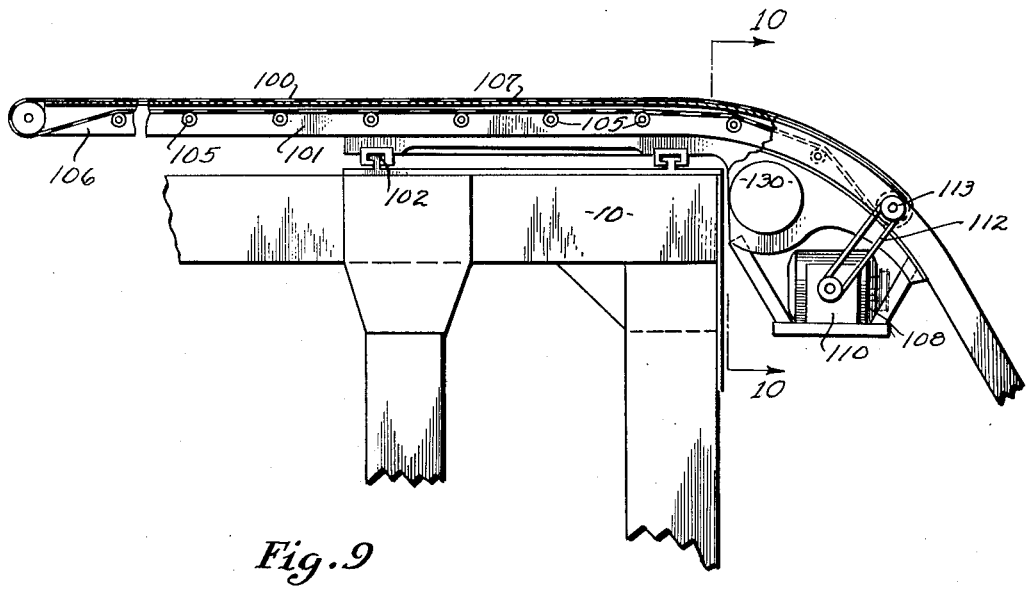
Figure 10:
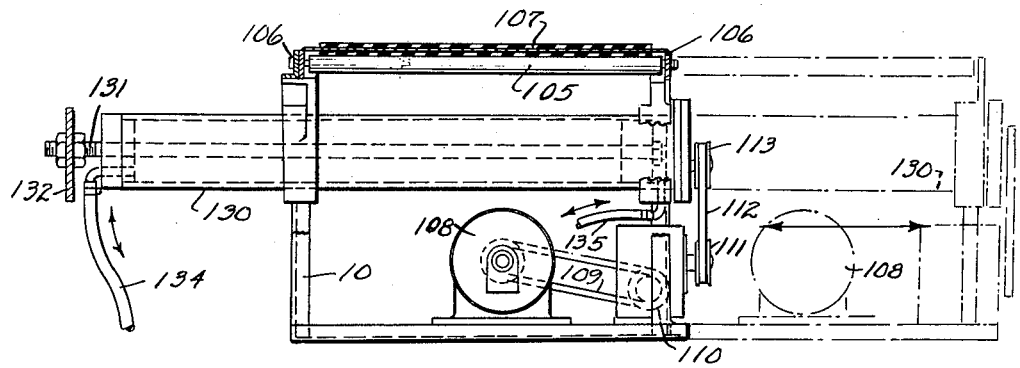

In these drawings, Fig. 1 is a side elevation partly broken away of the complete machine, and indicating by broken lines an associated tire building drum; Fig. 2 is a fragmentary transverse vertical section in a plane indicated by the line 2—2 on Fig. 1, showing mechanism for rotating the storage turret from one position to another; Fig. 3 is an end view of the machine, looking at the left hand end of Fig. 1, as indicated by the line 3—3 thereon; Fig. 4 is a vertical section on a larger scale through one of the storage members, as indicated by the lines 4—4 on Fig. 3; Fig. 5 is a fragmentary view showing a rewind device acting on a certain storage roll, this view being a vertical section in a plane indicated by the line 5—5 on Fig. 1; Fig. 6 is a horizontal section in a plane indicated by the line 6—6 in Fig. 1, showing the means for rotating the storage turret; Fig. 7 is a perspective showing means for feeding the strips to a positioned storage roll in the turret; Fig. 8 is a perspective showing an interconnection between each storage roll and the cooperating liner roll; Fig. 9 is a longitudinal vertical section through the conveyor for the tread strip; Fig. 10 is a transverse vertical section showing the tread conveyor with the means for shifting it.

As shown in the drawings, 10 indicates a suitable frame above which is a turret 20 pivotally connected to the frame on a vertical axis 21. The turret shown is equipped at its underside with four rollers 22, Figs. 1 and 6, set on radial axles and resting on a top plate 11 in the frame. The turret carries a pair of identical carrier drums 30 and 30a each having a pair of spaced vertical discs 31 and each journaled on horizontal axis 32 in the turret and each carrying a large number of strip supply rolls 40 and corresponding rolls 45 carrying sheet liners 46 to be interleaved with the strips on supply rolls, as hereinafter explained.

While the turret of my machine may be of any suitable construction, I will describe the particular construction shown. This comprises a pair of spaced vertical side plates 120 secured to the opposite ends of a frame made up of two spaced sets of structural members 121, as channel beams, arranged as shown in dotted lines in Fig. 1, and transversely braced. The turret also has a bottom plate 122 and a top plate 123 curving downwardly at its ends over the upper portion of the supply roll carriers.

In Fig. 1, 50 indicates a suitable table up which strip material may be fed to be passed to and mounted on the adjacent storage roll of the adjacent carrier, designated 30. Fig. 1 indicates in broken lines a suitable tire building drum 60 to which strips may be drawn downwardly from the adjacent roll 40 in the adjacent carrier, designated 30a. Suitable motor-driven mechanism operates to rotate the turret 180° whenever desired to interchange the position of the two carriers 30 and 30a. Thus while the material is being drawn from the left hand carrier in Fig. 1 other material may be fed to the right hand carrier, and when the left hand carrier becomes empty a half turn of the turret brings the filled carrier into position adjacent the tire building drum, and the empty carrier into position adjacent the feeding table.

I provide suitable motor mechanisms to turn the turret into the opposition from that shown, and to turn each carrier on its axis to bring a fresh supply roll to active position. These motor mechanisms will now be described.

The turret turning mechanism is shown in Figs. 1, 2 and 6. It comprises a motor 23, on the base plate 122 of the turret, having a worm 24 on its armature shaft meshing with a worm wheel 25 on a shaft 26 which carries a sprocket wheel 27 connected by sprocket chain 28 with a stationary sprocket wheel 29 on the base frame 10.

The carrier drum turning mechanism, shown in Figs. 1 and 3, is similar for each drum, the mechanism for one drum being mounted on one end of the turret and that for the other drum on the opposite end of the turret. The mechanism comprises a motor 70 mounted on an external member 71 of the turret and operating a shaft 72 which has a worm 73 meshing with a worm wheel 74 on the drum shaft.

Each supply roll 40 is interconnected with its liner roll 45 by a flexible strap 47 extending over pulleys 48 and 49 on the two rolls, as indicated in Fig. 8. One of these pulleys is tightly mounted on its shaft while the other is connected with its shaft by a wound-up internal spiral spring (not shown) tending to keep the strap taut, after the manner of Patent 1,952,904, issued March 27, 1934 to The Akron Standard Mold Company, as assignee of Henry C. Bostwick. The result is that whenever a supply roll is rotated at the loading position to receive a strip from the loading table 50, the corresponding liner roll is rotated in the opposite direction to unwind the canvas strip 46 from the liner roll to be wound-up with the strip supplied on the supply roll. And, vice versa, when stock is drawn off of a supply roll to the tire building drum, the slack of the freed lining strip is wound up on the corresponding liner roll.

One of the important features of this invention is its provision for carrying a large number of supply rolls and associated liner rolls in a very compact space. This is illustrated in Fig. 4, wherein are disclosed twelve supply rolls carried by each drum near its periphery and twelve associated liner rolls. The liner rolls, however, are mounted in two different circular courses; that is, six liner rolls are in an outer circle, each near the corresponding supply roll, and six of them are in an inner circle more distant from their corresponding supply rolls but each carrying a liner leading through the space between two liner rolls of the outer course. This staggered arrangement of the liner rolls enables them to be mounted without crowding each other in the space available within the drum.

To feed the strips from the supply table 50 to the adjacent supply roll 40 in the carrier 30, I provide certain motor driven mechanism shown in Figs. 1 and 7. This mechanism comprises a motor 80 carried by a bracket plate 12 extending from the machine frame 10; a rock shaft 81 journaled in bearings on the bracket; a pair of connected pulleys 82 loose on the rock shaft and connected by a belt 83 with a pulley on the motor; a pair of rock arms 85 tight on the shaft 81 and carrying at their free ends a shaft 86 on which is journaled a roller 87, and a belt 88 connecting a pulley on the roller 87 with one of the pulleys 82. One of the rock arms 85 is provided with an extension beyond its pivots on which is mounted a counter-weight 89. This counter-weight is insufficient to counter-balance the roller 87 when it is not rotating and hence that roller normally stands in the position indicated by broken lines at 87a.

When it is desired to feed the stock from the table 50 to an adjacent supply roll 40 the upper edge of the stock is placed manually in engagement with the upper portion of the storage roll and tucked into the bite between it and the canvas strip 46 from the adjacent liner roll. Then the motor is started and the rotation is in such direction that the shaft 81 and the roll 87 rotate in a clockwise direction (looking at the end of the mechanism, as shown in Figs. 1 and 7) and the torque supplied by this movement overcomes the excess of the weight of the roller 87 over its counter-weight and swings the arms and roller upwardly into position where the roller contacts with the adjacent storage roll 40, as shown in full lines in Figs. 1 and 7.

As long as the motor 80 continues to operate, the roll 87 continues to engage the roll 40 and drive it in the counter-clockwise direction to feed the strip A about the supply roll 40. When the strip being fed has become exhausted, or the supply roll filled, the current to the motor 80 is cut off and the driving roller 87 drops and the winding action ceases.

In the building of a tire on the drum 60 when sufficient fabric A has been supplied to the drum from the adjacent supply roll in the carrier 30a the fabric is severed a short distance above the drum. This leaves a loose end of the fabric hanging from the roll. To wind up this loose end, I provide an arcuate friction track 90, Figs. 1 and 5, which is carried by the turret in position to be engaged by a grooved pulley 91 on the shaft of the supply roll. The frictional engagement of this pulley 91 with the arcuate track rotates the corresponding roller 40 in the clockwise direction (Fig. 1) as the pulley 91 rolls along the track by the counter-clockwise rotation of the carrier 30a. The rotation thus given to the storage roll causes it to wind up onto the roll the excess of the strip, the severed portion of which has just been used on the tire drum.

It is frequently desirable to use a heavy tread strip to be wound around the drum. To enable the strip to be carried and fed to the drum I provide the conveyor 100, Figs. 1, 3, 9 and 10. This conveyor comprises a suitable base 101 slidably mounted on transverse guide rails 102 carried by the frame 10. The frame 10 has a longitudinal opening beneath the top portion which carries the turret which space is also open to one side of the frame, that is to the face shown in Fig. 1. The tracks 102 may extend laterally from the lower portion of this space to a position well beyond the turret.

The conveyor itself comprises a series of supporting rollers 105, mounted in longitudinal bars 106 carried on the base 101, and an endless belt 107, the upper reach of which rests on a flat table and the lower reach of which rests on the topmost portion of the rollers and the end portions of which loop around the end rollers.

The conveyor frame carries a motor 108 which is connected with the adjacent end roller 105 about which the belt loops. As shown particularly in Fig. 10, the motor is connected by a belt 109 with suitable reduction gearing 110 which has a pulley 111, and the latter is connected by a belt 112 with a pulley 113 on the adjacent end roll. Accordingly, when this motor is operated the belt is caused to travel, its upper reach moving toward the tire building drum 60, to convey the tread strip thereto.

To move the conveyor from its idle or loading position shown in broken lines in Fig. 10, to its active position, shown in full lines, I secure to the conveyor a horizontal cylinder 130 extending transversely to the machine frame, and I provide a stationary piston having a rod 131 adjustably connected to a bracket 132 attached to the machine frame. Fluid under pressure, preferably compressed air, is admitted by flexible conduits 134 and 135 to this cylinder on one side or the other of the piston, to shift the cylinder and conveyor, so that the conveyor may be carried with the tread strip from the idle position at the side to a position for action on the drum, or vice versa when the tread has been used.

It will be seen from the description given, that my machine provides, in a very compact space, a large number of supply rolls each associated with a liner roll, all these rolls being mounted in carriers rotatable on horizontal axes by simple motor-operated mechanism to bring successive rolls to position. Simply motor operated mechanisms also control the feeding of strips from the supply table to the supply roll positioned adjacent thereto, and control the turning of the turret in which a plurality of the carriers are mounted to bring fresh rolls into position for use and empty rolls into position for loading.

As stock is removed from a roll to the tire building drum the slack of the liner which was wrapped around the roll with it is automatically wound-up in the corresponding liner roll, and when the stock being applied to the drum is severed the end portion of the strip which depends from the supply roll is automatically wound up as the carrier is turned to position a fresh roll.

The provision of a power-operated tread-strip conveyor associated with the tire building drum and the stock carrier, and power mechanism for moving the conveyor bodily from a convenient loading position to its active position registering with the tire building drum, enables a comparatively heavy tread strip to be readily mounted and thereafter fed to the drum to be wound thereon in association with stock from the adjacent carrier.

Reference is made to a related apparatus in my copending application filed April 26, 1949, Serial No. 89,679, now Patent No. 2,521,728.

I claim:

1. In a servicing machine, the combination of a rotary carrier having a pair of spaced side plates normal to the axis of the carrier, a set of stock-carrying rolls between the side plates arranged in a circular course about the axis of the carrier and near the perimeter thereof, an equal number of liner-carrying rolls rotatably mounted in the space between the stock-carrying rolls and axis of the carrier, half of said liner rolls being arranged in a circular course adjacent the stock-carrying rolls and the other half of the liner rolls being arranged in a circular course between the first-mentioned half of said set and the axis of the carrier, and a set of flexible liners, those from the outer course of liner rolls passing to alternate stock rolls and those of the inner set passing to stock rolls located intermediately of the said alternate rolls.

2. In a servicing machine, the combination of a carrier rotatably mounted on a horizontal axis, a set of stock-carrying rolls rotatably mounted in the carrier on axes arranged in a circular course about the axis of the carrier, a set of liner rolls mounted between the stock rolls and the axis to the carrier, half of the set of liner rolls being mounted respectively adjacent every other stock roll and the other half of the set of liner-rolls being mounted nearer the axis of the carrier and substantially in the radial line from such axis to the other stock rolls, and flexible sheets leading respectively from each liner roll to the corresponding stock roll, the liner sheets from the inner set of liner rolls passing between two adjacent liner rolls of the outer set.

3. In a servicing machine, the combination of a carrier rotatably mounted, a set of stock carrying rolls rotatably mounted in the carrier on axes arranged in a circular course about the axis of the carrier and near the perimeter thereof, liner-carrying rolls rotatably mounted in the space between the stock-carrying rolls and axis of the carrier, some of said liner rolls being arranged in a circular course adjacent the stock-carrying rolls and the remainder of the liner rolls being arranged in a circular course between the first-mentioned set of liner rolls and the axis of the carrier, flexible sheets extending from each liner roll to the corresponding stock roll, the sheets from the inner set of liner rolls passing through the space between an adjacent pair of liner rolls of the outer set, and means connecting each stock roll with its liner roll to compel reverse rotation of the liner roll when the stock roll is rotated.

4. In a servicing machine, the combination of a movable carrier, a set of stock-carrying rolls arranged therein, and means for rotating any roll in the loading position to wind up a strip thereon, said means comprising a roller adapted to engage such positioned roll, a rocking frame carrying the roller, a rotary member at the axis of the frame connected with said roller to rotate the same, and mechanism for rotating said rotary member in the direction tending to cause engagement of said roller with the stock-carrying roll.

5. The combination with a stock-carrying roll of a roller for frictionally driving the same, a shaft journaled parallel with said roller, arms on the shaft carrying the roller, a driving pulley on the shaft connected with the pulley on the roller and a motor drivingly connected to said shaft to turn it in a direction tending to bodily shift the roller into engagement with the stock-carrying roll.

6. The combination, with a stock-carrying roller and a stock feed table spaced therefrom, of means between the roll and feed table for feeding stock from the table to the roll, said means comprising a roller, a frame carrying the roller pivotally mounted on an axis parallel with the roller, the roller being positioned to engage said roll by swinging on said axis, a pulley on the roller, a driving pulley at said axis, a belt connecting said pulleys, an electric motor, and mechanism drivingly connecting the same with said driving pulley.

7. The combination of a frame, a carrier, a set of stock rolls on horizontal axes in said carrier, there being a space in the frame beneath the carrier, and a conveyor comprising an endless belt adapted to stand in such space and means for moving the belt to convey a tread strip to a position adjacent the discharge from one of the carriers, whereby a stock strip carried by the carrier and a tread strip may be mounted on the same tire building drum.

8. The combination of a frame, a turret rotatably mounted on the frame on a vertical axis, a pair of carriers mounted in the turret, a set of stock rolls on horizontal axes in each carrier, there being a space beneath the turret, a conveyor in such space having an endless belt, and power means for moving it to convey a tread strip to a position adjacent the discharge from one of the carriers.

9. The combination with a stock-carrying roll, of a bodily shiftable roller normally out of contact with the stock-carrying roll but movable into such contact to frictionally drive said roll, mechanism for driving the roller from a source independent of the roller, said driving mechanism exerting a moving force on the roller greater than its tendency to remain stationary and in a direction to move the roller bodily into engagement with the stock-carrying roll to drive the same.

10. The combination with a stock-carrying roll of a bodily shiftable roller for frictionally driving the same, said roller being below the stock-carrying roll and normally out of contact therewith and being mounted on a pivoted member, a belt drive for the roller, mechanism for operating said drive in a direction tending to lift the roller, and a counterweight connected to said member on the other side of the pivot thereof to reduce the effective weight of the roller to an amount less than the upward pull on the roller of the driving mechanism, whereby the actuation of the belt to rotate the roller in a certain direction moves the shiftable roller into driving engagement with said stock-carrying roll.

11. In a servicing machine, the combination of an open rotary carrier, a set of stock-carrying rolls rotatably mounted in the carrier and arranged in a circular course about the axis thereof and near the periphery of the carrier, a corresponding number of liner-carrying rolls arranged in two courses one within the other in the space between the stock-carrying rolls and the axis of the carrier, and a set of flexible liners passing outwardly from each liner roll, the liners from the outer set of liner rolls passing to alternately located stock carrying rolls and the liners from the inner set of liner rolls passing between the liner rolls of the outer set to stock carrying rolls intermediate of those specified as alternately located rolls.

EDWARD C. KASTNER.

REFERENCES CITED

The following references are of record in the file of this patent:

UNITED STATES PATENTS

| Number | Name | Date |
|---|---|---|
| 1,121,793 | Brucker | Dec. 22, 1914 |
| 1,282,294 | Ross | Oct. 22, 1918 |
| 1,353,934 | Morris | Sept. 28, 1920 |
| 1,491,282 | Abbott et al. | Apr. 22, 1924 |
| 1,653,356 | Freeman et al. | Dec. 20, 1927 |
| 1,767,246 | Krause | June 24, 1930 |
| 1,966,087 | Bostwick | July 10, 1934 |
| 1,985,524 | Stacey | Dec. 25, 1934 |
| 2,045,534 | Stevens | June 23, 1936 |
| 2,242,810 | Bostwick | May 10, 1941 |
| 2,258,350 | Bostwick et al. | Oct. 7, 1941 |
| 2,277,476 | Bostwick | Mar. 24, 1942 |
| 2,343,954 | Carlin | Mar. 14, 1944 |
| 2,376,494 | Larabee | May 22, 1945 |
| 2,441,791 | Bostwick | May 18, 1948 |
| 2,473,067 | Miller | June 14, 1949 |